Figure 1:
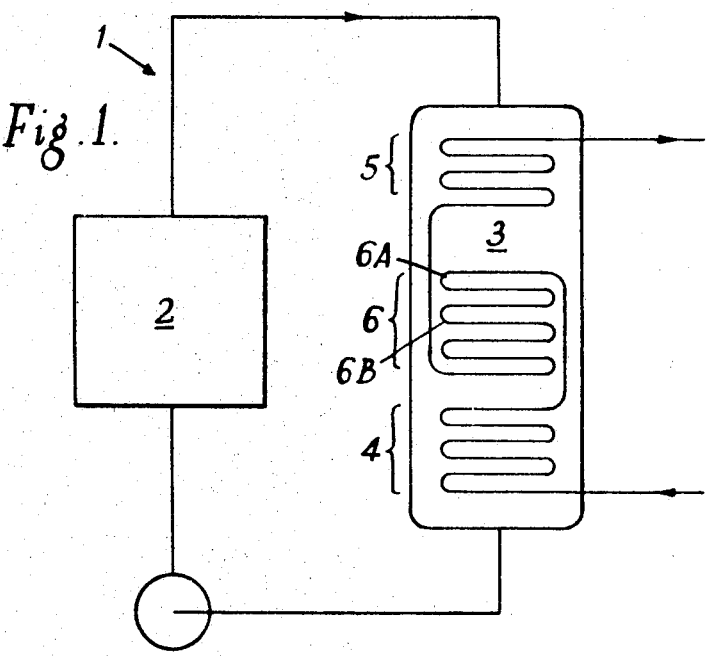

United States Patent Office 3,393,664
Patented July 23, 1968

3,393,664
HEAT EXCHANGER USEFUL IN NUCLEAR
REACTOR SYSTEM
Norman G. Worley, Anthony J. Taylor, and Charles L. Prasher, London, England, assignors to Babcock & Wilcox Limited, London, England a company of Great Britain
Filed Nov. 25, 1964, Ser. No. 413,687
Claims priority, application Great Britain, Nov. 25, 1963, 46,553/63; Dec. 24, 1963, 50,947/63; Jan. 3, 1964, 409/64
4 Claims. (Cl. 122—32)

This invention relates to vapor generating and superheating plant including a nuclear reactor, coolant of which serves as heating medium of a tubulous boiler adapted to generate and superheat vapor. When such plant is arranged to supply the vapor to a steam turbine, efficiency calls for the generation of steam at high pressure and high temperature of superheat. As a result mild steel may safely be used only for those heat exchange surfaces subjected to the lower temperatures not exceeding 700° F. or thereabouts. For higher temperatures relatively expensive alloy steels such as 12% chromium steel or austenitic stainless steel must be added.

The use of a once-through forced-flow boiler in nuclear vapor generating plant is advantageous since the number of necessary penetrations of the wall of the vessel enclosing the boiler heat exchange surfaces is relatively small. When, however, as is necessary or desirable, a nuclear reactor is operated with substantially constant reactor coolant inlet and outlet temperatures, the difficulty arises that as the load on the plant decreases so also does the length of the tubes lessen in which vapor generation occurs. Safety of the tubes at low loads may be insured by increasing the lengths of tubing of the relatively expensive steel or steels but this expedient is costly and if austenitic steel tubing is increased in length the risk may arise that under full load conditions the zone of evaporation to dryness is located in the austenitic tubing with consequent hazard of stress corrosion cracking.

By the present invention there is provided vapor generating and superheating plant including a nuclear reactor, coolant of which serves as heating medium of a once-through forced-flow boiler adapted to generate and superheat vapor in tubes the composition of which is varied from length to length thereof in order to enable the tubes to withstand the temperatures to which they are subjected during service. The tubes are so arranged that, in a region of the coolant flow path immediately downstream of a superheating section disposed at the coolant inlet to the boiler, the heat exchange surfaces are, at least at low loads, contacted by fluid at a lower temperature than would correspondingly positioned surfaces of a simple counterflow arrangement of the boiler tubes occupying the space between the said superheating section and the coolant outlet from the boiler and yet removing heat from the coolant through the same temperature range.

According to one aspect of the invention there is provided vapor generating and superheating plant including a nuclear reactor, coolant of which serves as a heating medium of a once-through forced-flow boiler adapted to generate and superheat vapor in tubes, the composition of which is varied from length to length thereof in order to enable the tubes to withstand the temperatures to which they are subjected during service, the boiler including an economizer section at the coolant outlet from the boiler, a superheater section at the coolant inlet to the boiler, and an intermediate section, the economizer section being arranged to operate with counterflow and the intermediate section being arranged to operate with parallel flow of the boiler working fluid and the coolant.

According to another aspect of the invention there is provided vapor generating and superheating plant including a nuclear reactor, coolant of which serves as heating medium of a once-through forced-flow boiler adapted to generate and superheat vapor in tubes, the composition of which is varied from length to length thereof in order to enable the tubes to withstand the temperatures to which they are subjected during service, provision being made for controllably supplying feed liquid to the tubes at the ends thereof remote from the superheater and at intermediate locations between the said ends and the superheater, whereby coolant temperature at an intermediate region in the coolant flow path through the boiler containing tube metal of lower heat resistance than that at the coolant inlet to the boiler may, when the load falls to a low value, be limited to a safe value.

According to a further aspect of the invention there is provided vapor generating and superheating plant including a nuclear reactor, coolant of which serves as heating medium of a once-through forced-flow boiler adapted to generate and superheat vapor in tubes, the composition of which is varied from length to length thereof in order to enable the tubes to withstand temperatures to which they are subjected during service, there being heat exchange surfaces in the coolant flow path upstream of heat exchange surfaces of metal of lower heat resistance, the cooling effect of which on the coolant at a given load is variable whereby coolant temperature at the metal of lower heat resistance may, as the load falls over a range from the maximum continuous rating, be limited to a safe value.

According to a yet further aspect of the invention there is provided vapor generating and superheating plant including a nuclear reactor, coolant of which serves as heating medium of a once-through forced-flow boiler adapted to generate and superheat vapor in tubes the composition of which is varied from length to length thereof in order to enable the tubes to withstand the temperatures to which they are subjected during service, circulating means for circulating, to a location in the coolant flow path through the boiler at or upstream of the commencement of heat exchange surfaces of tube metal of lower heat resistance than that of the heat exchange surfaces at the coolant inlet to the boiler, coolant cooled by heat exchange with heat exchange surfaces downstream of the said location, whereby coolant temperature at the heat exchange surfaces of metal of lower heat resistance may, when the load falls to a low value, be limited to a safe value.

The various features which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Figure 2:
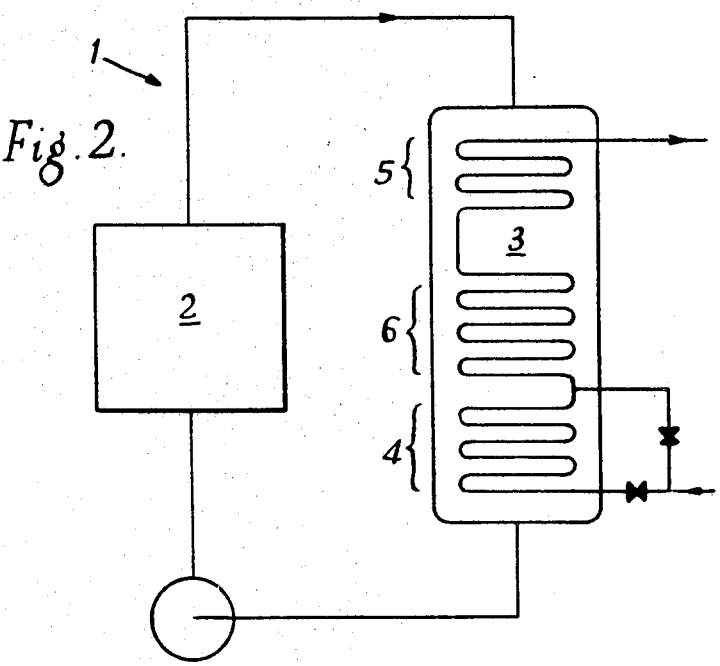
Figure 3:
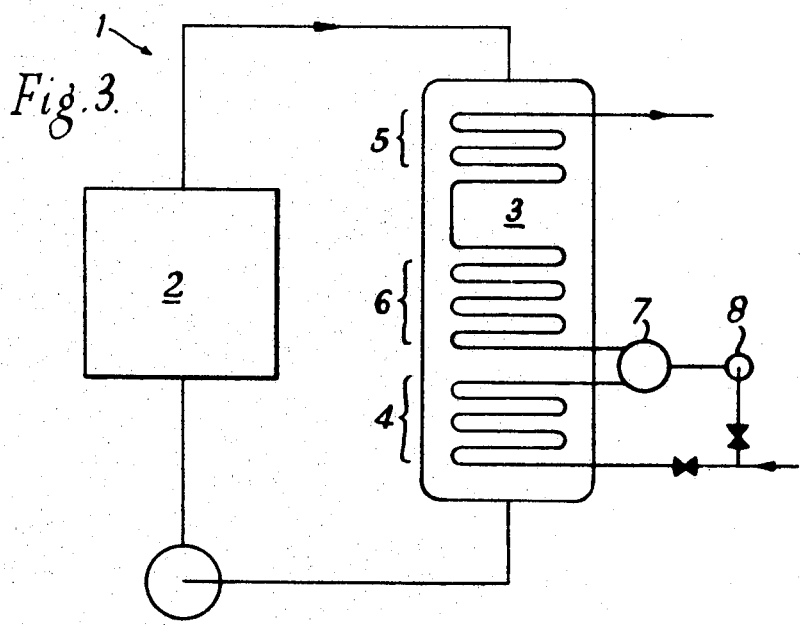
Figure 4:
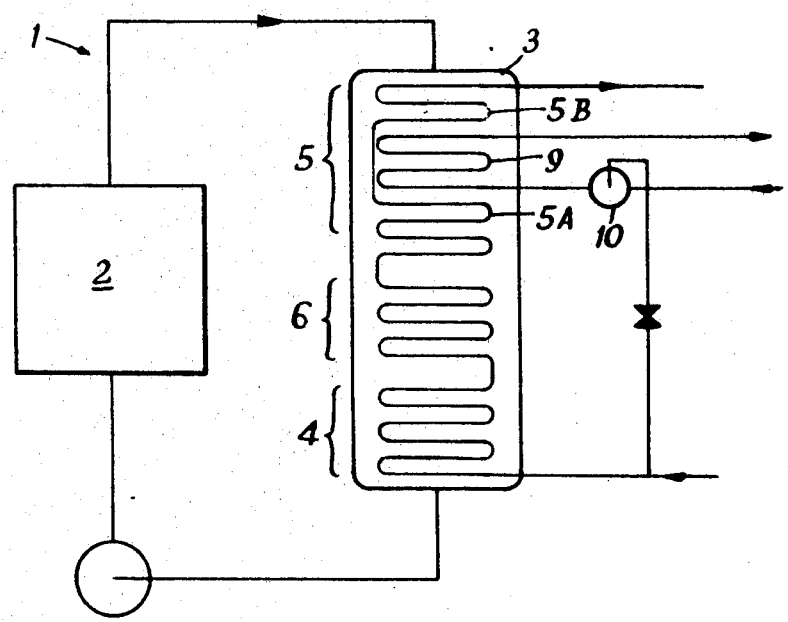
Figure 5:
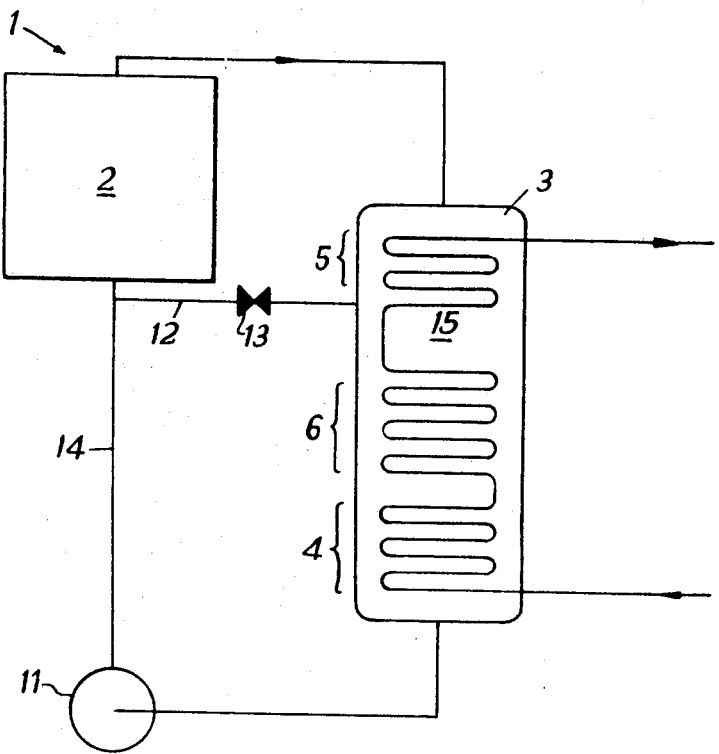

In the drawings:
FIG. 1 is a schematic illustration of a first embodiment of the present invention;
FIG. 2 is a schematic illustration of a second embodiment of the present invention;
FIG. 3 is an alternative arrangement of the embodiment illustrated in FIG. 2;
FIG. 4 is a schematic illustration of a third embodiment of the present invention; and
FIG. 5 is a schematic illustration of a fourth embodiment of the present invention.

The invention will now be described, by way of example, with reference to the accompanying drawings showing alternative embodiments of the invention in which steam raising and superheating plant 1 utilizing an advanced gas-cooled reactor 2 giving a gas inlet temperature at the boiler 3 of 1100° F. or thereabouts. The boiler 3 includes an economizer section 4 at the coolant outlet from the boiler, a superheater section 5 at the coolant inlet to the boiler and an intermediate section 6, each comprising portions of tube lengths arranged in parallel and being so dimensioned that at the maximum continuous rating of the boiler the heat inputs to all the boiler tubes are approximately equal, restrictions being provided to ensure approximately equal flows through the tubes. Tubing of mild steel issued in those regions experiencing a metal temperature of up to 700° F., 12% chrome steel is used for tubing in those regions experiencing higher metal temperatures of up to 1000° F. and austenitic stainless steel is used for tubing in those regions experiencing still higher temperatures of up to 1100° F.

Advantageously the plant 1 is of integral form, that is to say the boiler 3 and nuclear reactor 2 are contained in a common pressure vessel. Such plant is disclosed in the specification of U.S. Patent No. 2,946,732. Suitably the pressure vessel, which may be of reinforced concrete, is of spherical form and the boiler is disposed in an annular space between the nuclear reactor and the pressure vessel wall.

Referring to FIG. 1 of the drawings, the economizer section 4 is arranged to operate with counterflow between the working fluid and the coolant and the intermediate section 6 is arranged to operate with parallel flow of the boiler working fluid and the coolant. The superheater section 5 is also arranged to operate with counterflow of the boiler working fluid and the coolant. The intermediate section 6 includes a further economizer section 6A and an evaporator section 6B.

In operation there is a substantial temperature difference between the metal of the tubes of the intermediate section 6 in the neighborhood of the superheater section and the coolant flowing over that metal which is therefore protected from overheating at all loads. Moreover, thanks to the large temperature difference, the temperature of the coolant is rapidly reduced so that even at low loads other metal of relatively low heat resistance nearer the coolant outlet from the boiler is protected from overheating.

In the arrangement shown in FIGS. 2 and 3 provision is made for controllably supplying feed water to the inlet to the economizer section 4 and to the inlet to the intermediate section 6 either directly, as shown in FIG. 2, or through a mixing header 7, as shown in FIG. 3, connected to a feed pump 8.

During operation, when the load falls, the proportion of the total feed water supplied to the intermediate section 6 is increased so that reduction in temperature of the coolant as it flows away from the superheater section 5 is expedited. Distribution of the feed water between the inlet to the economizer section 4 and the inlet to the intermediate section 6 is either effected by hand or automatically in response to coolant or tube metal temperature at a predetermined location in the coolant flow path through the boiler or in response to boiler output.

It will be appreciated that the arrangement shown in FIG. 1 may be combined with the arrangement shown in FIG. 2 or FIG. 3 so that, in operation, when the load falls to a low value, the proportion of the total boiler working fluid supplied to the intermediate section 6 is increased further to increase the temperature difference between the coolant and the working fluid so that the tube metal of the section is adequately cooled and lowering of the temperature of the coolant as it flows through the boiler is expedited.

In the arrangement shown in FIG. 4, the boiler includes a reheater section 9 and an attemperator 10 for cooling steam flowing to the reheater. The reheater is disposed between primary and secondary superheater heat exchange surfaces 5A, 5B.

The attemperator is a spray attemperator so that when attemperation takes place not only is the steam flowing to the reheater section 9 cooled, but the mass flow of the vapor is increased thereby enhancing the cooling effect of the reheater heat exchange surfaces.

In operation, as the load on the plant falls from a maximum continuous rating, the pressure of the steam flowing to the reheater also falls and the temperature of the coolant at heat exchange surfaces of metal of lower heat resistance tends to rise, but by attemperating the steam flowing to the reheater section 9 the cooling of the coolant by the reheater heat exchange surfaces may be increased so that over a range of loads the temperature at the metal of the tubes of lower heat resistance is limited to a safe value.

Control over attemperation is effected either by hand or automatically in response to coolant or tube metal temperature at a predetermined location in the coolant flow path through the boiler or in response to the boiler output. Preferably the vapor temperature at the inlet to the reheater is not reduced to a temperature lower than 20° F. above saturation temperature at the instantaneous pressure of operation in order to obviate any danger of carry-over of water droplets. Alternatively a surface attemperator may be used.

Such coolant temperature control by regulation of the reduction in coolant temperature due to attemperation of steam flowing to the reheater may be used as an adjunct to the arrangements shown in FIGS. 1 to 3.

In the arrangement shown in FIG. 5, a circulator 11 is arranged to circulate the coolant in a closed circuit including in series the nuclear reactor 2 and the boiler 3 and a branch 12 provided with a control valve 13 leads from a duct 14 connecting the circulator 11 to the nuclear reactor 2 to a location 15 in the coolant flow path through the boiler at or upstream of the junction between the mild steel tubes and the 12% chrome steel tubes and between banks of boiler tubes. The recirculated coolant is discharged at a number of distributed points in order to achieve good mixing between the hotter and cooler streams of coolant before the mixture reaches the tube bank downstream of the location.

The recirculation of coolant is controlled to maintain a substantially constant coolant temperature at the junction of the mild steel and 12% chrome steel tubes.

It will be appreciated that reduction of the coolant temperature not only avoids overheating of tube metal but also lessens the temperature gradient between the working fluid of the boiler and the coolant and therefore the stresses in the tube metal of lower heat resistance.

It will also be appreciated that this arrangement described in connection with FIG. 5 may be used as an adjunct to the arrangements shown in FIGS. 1 to 4.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. Vapor generating and superheating plant including a nuclear reactor; a forced flow boiler including serially connected vapor generating and superheater sections adapted to generate and superheat vapor in tubes the composition of which from length to length thereof is varied to enable the tubes to withstand the temperatures to which they are subjected during service, the vapor generating section being located downstream in the coolant flow path of the superheater section and containing tube metal of lower heat resistance than the superheater section; means for recirculating coolant through the reactor, over said tubes, and back to the reactor; and means for controllably supplying vaporizable fluid from a common source in parallel flow relation to the inlet of the vapor generating section and to an intermediate location in the vapor generating section between its inlet and the superheater section, whereby coolant temperature at an intermediate region in the coolant flow path through the boiler containing tube metal of lower heat resistance than that at the coolant inlet to the boiler may, when the load falls to a low value, be limited to a safe value.

2. Plant as claimed in claim 1, wherein vaporizable fluid is controllably supplied to a mixing header in the vapor generating section.

3. Plant as claimed in claim 1, wherein the vapor generating section serves to effect vaporization of the working fluid and comprises lengths of tubes having portions respectively in a common economizer region and a common vapor generating region of the collant flow path.

4. A method of operating a vapor generating and superheating plant including a nuclear reactor, a forced flow boiler having serially connected vapor generating and superheater sections adapted to generate and superheat vapor in tubes the composition of which from length to length thereof is varied in order to enable the tubes to withstand the temperatures to which they are subjected during service, the vapor generating section being located downstream in the coolant flow path of the superheater section and containing tube metal of lower heat resistance than the superheater section, said method comprising circulating coolant through the reactor, over the tubes, and back to the reactor, supplying vaporizable fluid from a common source in parallel flow relation to the inlet of the vapor generating section and to an intermediate location in the vapor generating section, increasing the ratio of fluid supply to the intermediate location in the vapor generating section to the fluid supply to the inlet of the vapor generating section as load decreases to increase the cooling of the heat exchange surfaces at such location and thereby protect from overheating tube metal of low heat resistance.

References Cited

UNITED STATES PATENTS

| | | |
|---|---|---|
| 1,647,570 | 11/1927 | Kling. |
| 3,127,877 | 4/1964 | Profos _____ 122—406 |

FOREIGN PATENTS 903,012    8/1962    Great Britain.

OTHER REFERENCES

German printed application 1,122,082, published Jan. 19, 1962.

CHARLES J. MYHRE, *Primary Examiner.*